Figure 1:
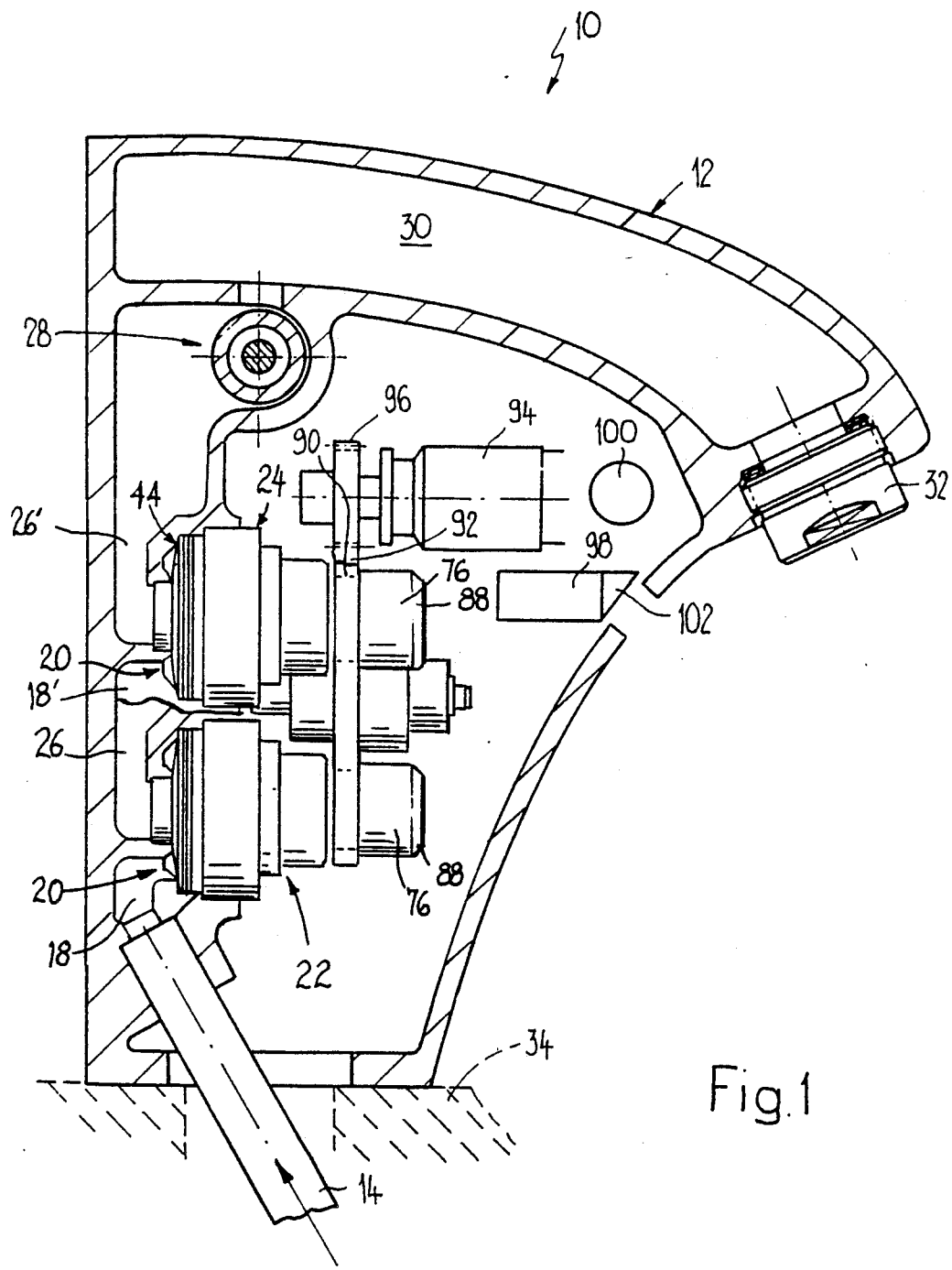

United States Patent [19]
Hochstrasser

[11] Patent Number: 5,107,894
[45] Date of Patent: Apr. 28, 1992

[54] ELECTRICALLY CONTROLLED SHUTOFF VALVE AND USE OF THE LATTER

[75] Inventor: Ferdinand Hochstrasser, Auenstein, Switzerland

[73] Assignee: KWC AG, Switzerland

[21] Appl. No.: 609,912

[22] Filed: Nov. 6, 1990

[30] Foreign Application Priority Data

Nov. 28, 1989 [CH] Switzerland ............ 04260/89

[51] Int. Cl.$^5$ ............................................. F16K 11/16
[52] U.S. Cl. ................................... 137/607; 251/65
[58] Field of Search .................... 137/606, 607, 595; 251/65, 38

[56] References Cited

U.S. PATENT DOCUMENTS

| | | |
|---|---|---|
| 2,301,439 | 11/1942 | Moen . |
| 2,346,904 | 4/1944 | Carlson ............................. 251/65 |
| 2,497,553 | 2/1950 | Littlefield . |
| 2,616,710 | 11/1952 | Woodruff . |
| 3,178,151 | 4/1965 | Caldwell . |
| 3,181,790 | 5/1965 | Smith ............................. 137/607 X |
| 3,306,570 | 2/1967 | Cooksley . |
| 3,472,277 | 10/1969 | Reinicke . |
| 3,550,901 | 12/1970 | McIntosh . |
| 3,667,722 | 6/1972 | Katz . |
| 3,818,928 | 6/1974 | Carsten ............................. 251/65 X |
| 3,977,436 | 8/1976 | Larner . |
| 4,561,629 | 12/1985 | Idogaki et al. ..................... 251/65 |
| 4,826,129 | 5/1989 | Fong et al. ....................... 251/65 X |

FOREIGN PATENT DOCUMENTS

| | | |
|---|---|---|
| 312781 | 9/1988 | European Pat. Off. . |
| 1775108 | 7/1971 | Fed. Rep. of Germany . |
| 2902410 | 7/1980 | Fed. Rep. of Germany . |
| 2225675 | 4/1973 | France . |
| 2334037 | 12/1975 | France . |
| 2335767 | 9/1976 | France . |
| 2103391 | 2/1983 | United Kingdom .......... 251/65 |

Primary Examiner—Stephen M. Hepperle
Attorney, Agent, or Firm—Barnes & Thornburg

[57] ABSTRACT

The mixing fitting (10) has a shutoff valve (22) for hot water and a shutoff valve (24) for cold water. These shutoff valves (22, 24) are constructed as diaphragm valves and each have an auxiliary valve (62, 62') provided in the pilot control space (50). To operate these auxiliary valves (62, 62'), permanent magnets (76) are provided which can be swivelled about the axle (80') into and out of the range of action on the closure elements (64) of the auxiliary valves (62, 62'). To open the shutoff valves (22, 24), the swivel body (78) is swivelled by means of the drive (94) with the permanent magnets (76) into the region of the closure elements (64), by which means the latter are pulled toward the permanent magnets (76) with the auxiliary valve (62, 62') opening. The pressure in the pilot control space (50) drops and the shutoff valve (22, 24) is opened by the closure part (44) being lifted from the valve seat (40). If the permanent magnets (76) are again swivelled out of the range of action on the closure elements (64), the latter close the auxiliary valves (62, 62'), which results in the pressure in the pilot control space rising again due to the passage (52). The closure part (44) again comes to rest on the corresponding valve seat. The shutoff valve (22, 24) is thus closed.

16 Claims, 3 Drawing Sheets

ELECTRICALLY CONTROLLED SHUTOFF VALVE AND USE OF THE LATTER

The present invention relates to an electrically controlled shutoff valve and its use.

Shutoff valves of this type such as are produced and distributed, for example, by Messrs. Honeywell-Lucifer SA, Geneva, have a diaphragm-shaped closure part which interacts with an annular valve seat. An annular channel connected to an inlet and open toward the closure part extends around the valve seat. Said annular channel is connected via a passage in the closure part to a pilot control space provided on the other side of the closure part. Provided in said pilot control space is an auxiliary valve which has a closure element interacting with an auxiliary valve seat. The auxiliary valve seat is constructed on the closure part and is connected via an opening to an outlet bounded by the valve seat. The closure element arranged in the pilot control space is constructed as a solenoid plunger and can be lifted from the auxiliary valve seat by means of a solenoid arranged in a stationary manner and surrounding the pilot control space. When the solenoid is not excited, the closure element rests on the auxiliary valve seat and the pressure in the interior of the pilot control space corresponds to the pressure in the inlet of the shutoff valve. As a result of the difference in surface of the mutual application of pressure of the diaphragm-shaped closure part in the region of the annular channel or of the pilot control space, the closure part is pressed onto the valve seat. The shutoff valve is closed. To open the shutoff valve, the closure element is lifted from the auxiliary valve seat by exciting the solenoid. By this means, the pilot control space is connected to the outlet, which results in the pressure in the pilot control space dropping as the opening connecting the pilot control space to the outlet has a larger cross-section of flow than the passage connecting the annular channel to the pilot control space. By this means, the closure part is lifted from the valve seat and the water flow from the annular channel around the valve seat into the outlet is released. As soon as the closure element again comes to rest on the auxiliary valve seat due to de-excitation of the solenoid, the pressure in the pilot control space rises again since the outflow of the water from said pilot control space is now prevented which results in the closure part coming to rest on the valve seat. For opening and keeping open this shutoff valve, a considerable amount of electric energy is required.

It is therefore an object of the present invention to provide a shutoff valve of the generic type which requires less energy for its operation. Furthermore, an advantageous use of a shutoff valve of this type is to be proposed.

The movement of a permanent magnet arrangement into and out of the range of action on the auxiliary valve requires very little energy and, in particular, no energy is required for keeping the auxiliary valve open.

In an advantageous manner, shutoff valves of this type are used in an electrically driven sanitary fitting. Since the shutoff valves require extremely little energy, fittings of this type can be driven by means of a battery or an accumulator for a relatively long time.

Preferred embodiments of the shutoff valve and preferred developments of the use of such shutoff valves are indicated in the dependent claims.

Figure 2:
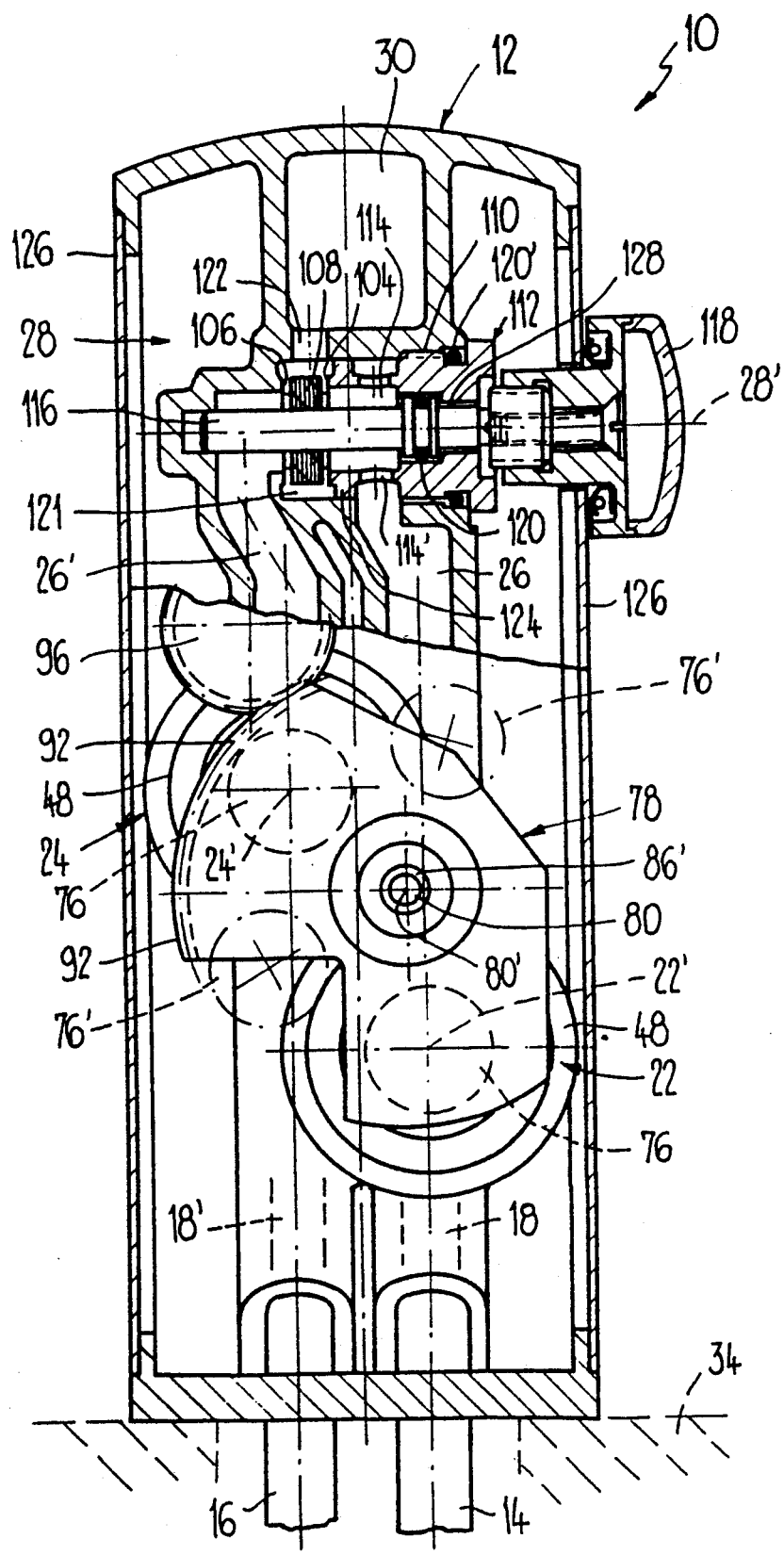
Figure 3:
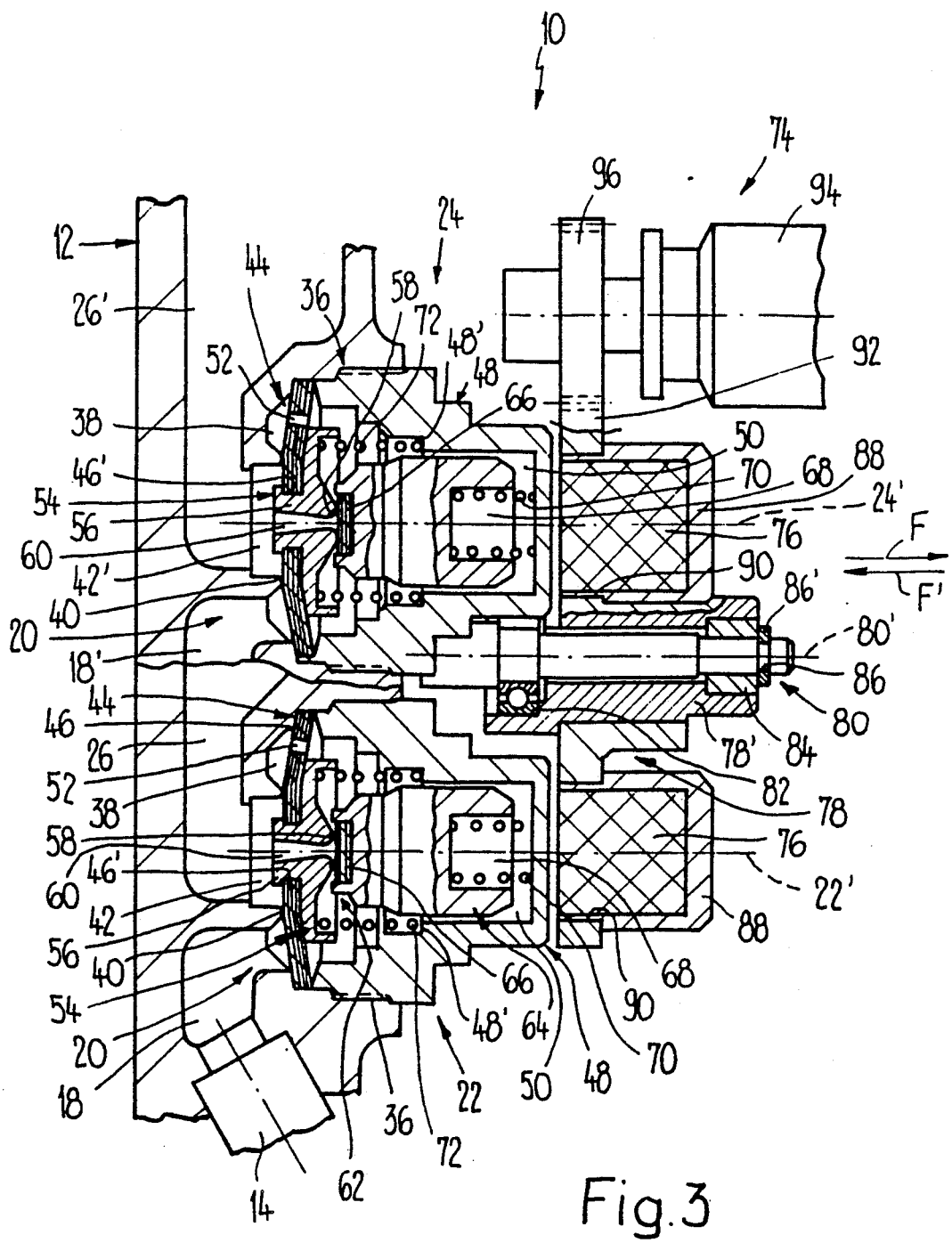

The invention is now explained in greater detail with reference to an exemplary embodiment illustrated in the purely diagrammatic drawing, in which:

FIGS. 1 and 2 show vertical sections, perpendicular to each other, of a mixing fitting, the flow paths being shown partially placed in the planes of section, and FIG. 3 shows an enlargement of a part of FIG. 1.

The mixing fitting 10 shown in FIGS. 1 to 3 has a cast basic body 12, in which the flow paths for the cold, hot and mixed water are recessed. The hot and cold water fed to the mixing fitting 10 via inflow lines 14, 16 is conducted via corresponding recesses 18, 18' in the basic body 12 to inlets 20 of shutoff valves 22, 24. On the outlet side, the two shutoff valves 22, 24 are connected in terms of flow to a mixing valve 28 via in each case one further recess 26 and 26', from which mixing valve the mixed water is conducted through an outlet recess 30 in the basic body 12 to an outflow head 32. The mixing fitting 10 is attached in a known manner to a washbasin 34 indicated in FIGS. 1 and 2.

The shutoff valve 22 for hot water and shutoff valve 24 for cold water are identical and are constructed essentially symmetrically in terms of rotation and are arranged adjacent to each other, one above the other and obliquely offset on the basic body 12, the axles 22' and 24' of the two shutoff valves 22, 24 extending parallel to each other. The shutoff valves 22, 24 are inserted in essentially cylindrical recesses 36 in the basic body 12. Constructed in the bottom region of each recess 36 is an annular channel 38 which is open in the axial direction and is connected to the relevant inlet 20, which annular channel is bounded in the radial direction in respect of the axles 22', 24' on the inside by an annular valve seat 40 (cf. in particular FIG. 3). The outlet 42, 42' of each shutoff valve 22 or 24 is bordered by the relevant valve seat 40 and opens out into the relevant further recess 26, 26'.

The two shutoff valves 22, 24 are illustrated enlarged in FIG. 3. Therefore, for reasons of better clarity, not all the reference numerals relating to the shutoff valves 22, 24 are specified in FIG. 1 which are entered in FIG. 3.

The annular channel 38, valve seat 40 and outlet 42 or 42' are covered by a closure part 44 provided in the bottom region of the recess 36. Said closure part has a disk-shaped diaphragm 46 made of rubber elastic material, which diaphragm is braced along its periphery between a shoulder 36' of the recess 36 and the end on this side of a hood-shaped lid 48 made of non-magnetizable material, for example brass, which is screwed into the recess 36. The closure part 44 and the lid 48 enclose a pilot control space 50 which is connected in terms of flow to the annular channel 38 via a passage 52 in the diaphragm 46. The pilot control space 50 is thus situated on the side of the closure part 44 facing away from the valve seat 40. Furthermore, on the side of the pilot control space, the closure part 44 has an approximately disk-shaped reinforcing member 54 which is fixed on the diaphragm 46 by means of a holding head 56 penetrating a central opening 46' in said diaphragm 46. The diaphragm 46 covers the annular channel 38 and partially the outlet 42, 42' and the reinforcing member 54 overlaps the diaphragm 46, seen in the radial direction, beyond the valve seat 40.

Molded onto the reinforcing member 54 is an annular auxiliary valve seat 58 which projects toward the pilot control space 50 and which bounds a pilot opening 60 penetrating the reinforcing member 54 in the region of the axle 22', 24'. Said pilot opening connects the pilot control space 50 to the outlet 42, 42'. The auxiliary valve seat 58 is part of an auxiliary valve 62, 62' and it interacts with an essentially cylindrical closure element 64 arranged in the interior of the pilot control space 50. Said closure element has on the side facing the auxiliary valve seat 58 a sealing disk 66 which overlaps the pilot opening 60 and the auxiliary valve seat 58 and, when the auxiliary valve 62, 62' is closed, rests on the auxiliary valve seat 58 in order to interrupt the connection through the pilot opening 60 between the pilot control space 50 and the outlet 42, 42'. On the side facing away from the auxiliary valve seat 58, a blind hole 68 is recessed in the closure element 64, in which blind hole an auxiliary valve compression spring 70 engages which is supported at one end on the closure element 64 and at the other end on the lid 48.

In the interior, the lid 48 has a shoulder 48', on which the one end of a compression spring 72 is supported, the other end of which rests on the reinforcing member 54. This compression spring 72 presses the closure part 44 against the valve seat 40.

The drive arrangement 74 for the two auxiliary valves 62, 62' has two permanent magnets 76 assigned in each case to one auxiliary valve 62, 62', which permanent magnets are arranged on an essentially plate-shaped swivel body 78. Seen in the direction of the axles 22', 24', the swivel body 78 is spaced slightly away from the lids 48 of the shutoff valves 22, 24 and mounted in a swivelling manner on a shaft 80 attached to basic body 12 via a hollow cylindrical mounting part 78' connected fixedly to said swivel body. The axle 80' of the shaft 80 extends parallel to the axles 22', 24' and is situated spaced approximately at the same distance from said axles in the region between the two shutoff valves 22, 24. A movement of the swivel body 78 in the direction toward the shutoff valves 22, 24 is prevented by a ball bearing 82 which is supported, on the one hand, on the shaft 80 and, on the other hand, on the mounting part 78'. At the end region remote from the ball bearing 82, the mounting part 78' has a mounting sleeve 84 which slides on the shaft 80. In the end region of the shaft 80 at this side, a circumferential groove 86 is provided, in which a spring ring 86' is arranged which prevents the swivel body 78 from moving away from the shutoff valves 22, 24. The permanent magnets 76 are held in a cap-shaped cover 88 which encloses the permanent magnets 76 on all sides apart from the sides facing the shutoff valves 22, 24. The covers 88 are inserted in circular openings 90 in the swivel body 78. In the operating position of the swivel body 78 shown in the figures, the axles of the permanent magnets 76 coincide with the axles 22', 24'. By swivelling the swivel body 78 clockwise about the shaft 80 (FIG. 2), the permanent magnets 76 can be swivelled out of the range of action on the closure elements 64 of the auxiliary valves 62, 62' into a position 76' of rest indicated by dot-dashed lines in FIG. 2. The swivel angle of the swivel body 78 is approximately 60°. For this purpose, a gearwheel segment 92, which is coaxial to the axle 80', is molded onto the swivel body 78, which gearwheel segment meshes with a pinion 96 arranged on a drive 94 constructed as a direct current motor with an integrated reducing gear.

The drive 94 is actuated by an electronic control 98 which is fed by means of a diagrammatically illustrated battery 100. The control 98 has a sensor 102 which detects the presence of hands to be washed in the range of action of the sensor 102, i.e. in the region of the washbasin 34.

The mixing valve 28 has two essentially circular mixing valve seats 104 and 106 which are aligned with each other, are spaced apart in the direction of the axle 28' of the mixing valve 28 and lie essentially in planes which are perpendicular to said axle 28' (see FIG. 2). Provided in the region between the two mixing valve seats 104, 106 is a disk 108 made of rubber elastic material, the axial lateral surfaces 108' of which interact with the mixing valve seats 104 and 106 and each bound an annular outlet gap. The mixing valve seat 106 is constructed on a shoulder of a blind hole-shaped recess 110 in the basic body 12, which recess extends in the direction of the axle 28', and the other mixing valve seat 104 is formed by the end of a sleeve-shaped journal 112 screwed into the recess 110. The mixing valve seat 106 bounds the further recess 26' which connects the outlet 42' of the shutoff valve 24 for the cold water to the mixing valve 28. The journal 112 has a cavity 114 which is open toward the disk 108, is bounded by the relevant mixing valve seat 104 and is connected via radial passages 114' to the further recess 26, which recess connects the outlet 42 of the shutoff valve 22 for hot water to the mixing valve 28. Guided through the journal 112 is a lifting shaft 116, on which the disk 108 is firmly seated and on the other outer free end of which an operating head 118 is arranged so as to be fixed in terms of rotation. At the inner end, the lifting shaft 116 is mounted rotatably on the basic body 12. The lifting shaft 116 has an external thread 120, by means of which it is guided in a corresponding internal thread in the journal 112 in such a way that it can move to and fro in the axial direction when the operating head 118 is rotated about the axle 28'. Along the lifting shaft 116, the cavity 114 is sealed off by means of an O-ring 120 which is seated in a corresponding groove in the lifting shaft 116 and slides on the inside wall of the journal 112. A further O-ring 120' is provided between the outer end region of the journal 112 and the beginning region of the recess 110.

An annular channel 121 surrounding the disk 108 between the two mixing valve seats 104 and 106 is connected in terms of flow by an opening 122 connecting the recess 110 to the outlet recess 30. This annular channel 121 is sealed off from the region of the recess 110 connected in terms of flow to the further recess 26 by a circumferential elevation 124 molded onto the journal 112.

For reasons of completeness, it should be mentioned that the mixing fitting 10 has lateral covers 126 which cover the active parts of the mixing fitting 10, the operating head 118 of the mixing valve 28 penetrating the one lateral cover 126 freely rotatably in order to allow the operating head 118 to be operated from outside the fitting 10.

If the permanent magnets 76 are situated in the operating position illustrated in the figures, said permanent magnets act with a force F (FIG. 3) on the relevant closure element 64 and lift said closure element from the auxiliary valve seat 40 against the force of the auxiliary valve compression spring 70 and the resulting force of the water pressure in the direction of the axle 22', 24'. F' denotes the magnetic reaction force which is of the same size as the force F but acts counter to said force and which acts on the permanent magnets 76. This magnetic reaction force F' extends parallel to the axle 80' when the permanent magnets 76 are in the operating position and approximately perpendicular to the direction of movement of the permanent magnets 76 when they are swivelled about the axle 80'.

The mixing fitting 10 shown in the figures functions as follows. If the sensor 102 does not detect any hands to be washed, the permanent magnets 76 together with the swivel body 78 are in the position 76' of rest indicated by dot-dashed lines in FIG. 2. The auxiliary valves 62, 62' are closed, the sealing disks 66 of the closure elements 64 rest on the relevant auxiliary valve seats 58 and thus separate the pilot control spaces 50 from the relevant outlet 42, 42'. As a result of the flow connection between the annular channel 38 and the pilot control space 50 through the passage 52, the water pressure in the interior of the pilot control space 50 corresponds to the water pressure in the relevant inlet 20. On the outlet side of the shutoff valves 22, 24, the pressure corresponds essentially to the ambient pressure, by which means the closure part 44 is pressed against the valve seat 58 with a force originating from the water pressure, which force is proportional to the pressure difference between the pilot control space 50 and the outlet 42, 42' and to the difference between the surfaces of the closure part 44 which face the pilot control space 50 and annular channel 28 and to which pressure is applied. Additionally, the closure part 44 is pressed against the valve seat 40 by the auxiliary valve compression spring 70 and compression spring 72. In this case, the reinforcing member 54 prevents the diaphragm 46 from being overstressed and from bulging into the outlet 42 or 42'. Furthermore, the closure element 64 is pressed against the auxiliary valve seat 58 by the force of the auxiliary valve compression spring 70 and a force which is proportional to the pressure difference in the pilot control space 50 and outlet 42, 42' and to the surface of the sealing disk 66 bounded by the auxiliary valve seat 58. The shutoff valves 22, 24 are thus closed.

If hands to be washed are now brought into the range of detection of the sensor 102, the latter passes a corresponding signal to the electronic control 98. Said control actuates the drive 94 until the swivel body 78 has swivelled counterclockwise with the permanent magnet 76 (FIG. 2) into its operating position, in which the permanent magnets 76 are aligned with the closure elements 64 of the auxiliary valves 62, 62'. Due to the magnetic field produced by the permanent magnets 76, the closure elements 64 are lifted from the auxiliary valve seat 58 with the force F against the force of the compression spring 70 and the resulting force due to the water pressure and are pulled in a direction toward the permanent magnets 76. In this case, water begins to flow from the pilot control spaces 50 through the pilot openings 60 into the outlets 42, 42'. Since the cross-section of flow of the pilot openings 66 is greater than the cross-section of flow of the passages 52, the pressure drops in the pilot control spaces 50. Since, however, the water fed in presses with a high pressure against the closure part 44 in the annular channels 38, said closure part is slowly lifted from the valve seat 40, by which means the water fed in through the recesses 18, 18' can flow from the annular channels 38 around the valve seats 40 into the outlets 42, 42'. The shutoff valves 22, 24 are opened. The hot and cold water fed to the mixing valve 28 from the shutoff valves 22, 24 through the further recesses 26, 26' is mixed there and passed to the outflow head 32 through the outlet recess 30.

By rotating the operating head 118, the lifting shaft 116, together with the disk 108 seated on it, can optionally be moved toward the one or the other mixing valve seat 104 or 106. In this case, the cross-section of throughflow between the disk 108 and the mixing valve seats 104 and 106 change in mirror image which leads to more or less cold or hot water being passed to the outlet recess 30. The temperature of the mixed water can thus be adjusted by rotating the operating head 118. If the disk 108 is brought to rest on a mixing valve seat 104 or 106, only hot water or cold water respectively can thus flow to the outflow head 32.

If the washed hands are then removed from the range of detection of the sensor 102, the electronic control 98 feeds the drive 94 in the opposite direction which results in the permanent magnets 76 being swivelled back clockwise with the swivel body 78 into its position 76' of rest. In this case, the permanent magnets 76 pass out of the range of action on the closure elements 64 which results in the latter being brought to rest on the corresponding auxiliary valve seat 58 by the force of the auxiliary valve compression springs 70. Thus no more water can flow out of the pilot control space 50 through the pilot opening 60. Thus a pressure balance again arises between the water in the annular channel 38 and in the pilot control space 50. The closure part 44 is brought to rest on the valve seat 40 due to the force of the compression spring 72, the auxiliary valve compression spring 70 and the resulting force from the pressure and surface difference on both sides of the closure part 44. In this case, the water flow between the valve seat 40 and the closure part 44 is slowly reduced until it is completely blocked. This slow reduction of the quantity of water flowing out prevents pressure surges in the inflow lines 14 and 16. The shutoff valves 22, 24 are closed.

The magnetic reaction force F' is picked up in each case by the mounting of the swivel body 78. The swivel direction of the permanent magnets 76 extends in the operating position of the permanent magnets 76 at right angles to the magnetic reaction force F' and transversely to said force in the beginning region of the swivel movement out of the range of action on the auxiliary valves 62, 62'. Attention must be paid to the fact that the drive 94 only has to apply the components of the magnetic reaction force F' in the tangential direction relative to the axle 80'. In relation to the magnetic reaction force F', this force is relatively small which leads to the operation of the auxiliary valves 62, 62' requiring extremely little energy. This energy for operating the fitting 10 can be reduced further if the component of the magnetic reaction force F' acting in the direction of movement of the permanent magnets 76 is compensated, for example, by means of a spring arrangement. In this case, the drive 94 only has to apply the forces for accelerating the moved masses and overcoming the friction. The acceleration forces, in particular, can be minimized if the masses are moved at small accelerations. This is quite permissible in the case of mixing fittings 10.

It is, of course, also conceivable to replace the direct current gear motor by another drive. Thus, the permanent magnets 76 and the swivel body 78 could be swivelled, for example, by means of a solenoid arrangement.

In order to simplify the control 98, it is also conceivable to provide stationary reed relays in the operating and resting position of the permanent magnets 76, which reed relays respond as soon as the relevant position is reached. Furthermore, the permanent magnets 76 could also be swivelled to and fro by means of a crank mechanism which has the advantage that the drive can always rotate in the same direction of rotation. This, in turn, results in simplification of the electronic control.

For reasons of completeness, it should also be mentioned that the permanent magnets 76 can be swivelled out of and into the range of action on the auxiliary valves 62, 62' about an axle which extends essentially at right angles to the axles 22', 24'.

In FIGS. 1 to 3, two shutoff valves 22, 24 are shown which are operated by means of a common drive arrangement 74. Of course, a single shutoff valve can be controlled analogously by means of a permanent magnet.

Of course, fittings are also conceivable having only a single shutoff valve which, for example in a mixing fitting, releasably blocks the mixed water or, in a fitting with only one feed line, releasably blocks the water flow of this feed line.

What is claimed is:

1. An electrically controlled shutoff valve for a flowing medium, having an inlet and an outlet, and having a closure part, on the one side of which there is provided a valve seat interacting with said closure part and, on the other side, a pilot control space connected to the inlet via a passage, which pilot control space can be connected to or separated from the outlet by means of an auxiliary valve for opening and closing the shutoff valve, which auxiliary valve is arranged in the pilot control space and can be operated magnetically by a drive arrangement fed with electricity, wherein the drive arrangement (74) has a permanent magnet arrangement (76) which can be brought into and out of action on the auxiliary valve (62, 62') by means of a drive (94) fed with electricity, wherein the direction of movement of the permanent magnet arrangement (76) extends transversely in relation to the direction of the magnetic reaction force (F') on the permanent magnet arrangement (76).

2. The shutoff valve as claimed in claim 1, wherein the permanent magnet arrangement (76) can be swivelled about an axle (80') extending essentially parallel to the direction of the reaction force (F').

3. The shutoff valve as claimed in claim 1, wherein the permanent magnet arrangement (76) is arranged on a rotatably mounted swivel body (78).

4. The shutoff valve as claimed in claim 1, wherein the pilot control space (50) is bounded on the side facing away from the closure part (44) by a lid (48) made of an essentially non-magnetizable material, beyond which lid the permanent magnet arrangement (76) can be moved, and the auxiliary valve (62, 62') has a closure element (64) interacting with an auxiliary valve seat (58) arranged on the closure part (44), which closure element can be lifted by the permanent magnet arrangement from the auxiliary valve seat (58) when said permanent magnet arrangement (76) is moved into the region of the lid (48).

5. The use of a shutoff valve as claimed in claim 1 in an electrically driven sanitary fitting (10).

6. The combination of claim 5, wherein the fitting (10) has a hot and a cold water inflow (14, 16) and an outflow (32) and is provided with in each case one shutoff valve (22, 24) arranged between the relevant inflow (14, 16) and the outflow (32) for releasable blocking of the hot and cold water flow, the permanent magnet arrangement comprises a permanent magnet element for each shutoff valve, it being possible for the permanent magnet arrangement (76) for operating the two auxiliary valves (62, 62') to be brought into and out of action on the auxiliary valves (62, 62') by means of a common drive (94).

7. The use as claimed in claim 6, wherein the shutoff valves (22, 24) are arranged adjacently and essentially parallel to each other in the fitting (10), and the permanent magnet arrangement (76) is provided on a common swivel body (78) which can be swivelled about a rotating axle (80').

8. The use as claimed in claim 7, wherein the swivel body (78) has a gearwheel segment (92) which is coaxial to the rotating axle (80'), which gearwheel segment meshes with a pinion (96) driven by a drive (94) fed by electricity.

9. The use as claimed in claim 6, wherein a mixing valve (28) is connected downstream from the two shutoff valves (22, 24), which mixing valve has two annular mixing valve seats (104, 106) which are spaced apart, are essentially aligned with each other, are directed opposite to each other and bound lines (26, 26') coming from the shutoff valves (22, 24), and has a disk (108) which is displaceable to and fro between the mixing valve seats (104, 106) and interacts with its lateral surfaces with said mixing valve seats, and the outflow openings between the mixing valve seats (104, 106) and the disk (108) are connected to the outflow (32).

10. The electrically controlled shutoff valve of claim 1 wherein the flowing medium is water.

11. The shutoff valve of claim 3 and further comprising an electric motor (94) for driving the rotatably mounted swivel body (78).

12. The use as claimed in claim 5 wherein the sanitary fitting comprises a washbasin fitting.

13. The use as claimed in claim 7 wherein the shutoff valves (22, 24) are arranged adjacently and essentially parallel to each other in the fitting (10) in a common body (12).

14. The use as claimed in claim 7 wherein the axle 80' extends between the shutoff valves (22, 24).

15. The use as claimed in claim 9 wherein the disk (108) is constructed from rubber elastic material.

16. In an electrically controlled sanitary fitting, an electrically controlled shutoff valve for a flowing medium, having an inlet and an outlet, and having a closure part, on the one side of which there is provided a valve seat interacting with said closure part and, on the other side, a pilot control space connected to the inlet via a passage, which pilot control space can be connected to or separated from the outlet by means of an auxiliary valve for opening and closing the shutoff valve, which auxiliary valve is arranged in the pilot control space and can be operated magnetically by a drive arrangement fed with electricity, wherein the drive arrangement (74) has a permanent magnet arrangement (76) which can be brought into and out of action on the auxiliary valve (62, 62') by means of a drive (94) fed with electricity, the fitting (10) having a hot and a cold water inflow (14, 16) and an outflow (32) and being provided with in each case one shutoff valve (22, 24) arranged between the relevant inflow (14, 16) and the outflow (32) for releasable blocking of the hot and cold water flow, the permanent magnet arrangement comprising a permanent magnet element for each shutoff valve, it being possible for the permanent magnet arrangement (76) for operating the two auxiliary valves (62, 62') to be brought into and out of action on the auxiliary valves (62, 62') by means of a common drive (94), the shutoff valves (22, 24) being arranged adjacently and essentially parallel to each other in the fitting (10), and the permanent magnet arrangement (76) being provided on a common swivel body (78) which can be swivelled about a rotating axle (80').

* * * * *